July 27, 1926.
L. L. MILLER
BIT BRACE CHUCK
Filed March 12, 1925
1,593,908
2 Sheets-Sheet 1
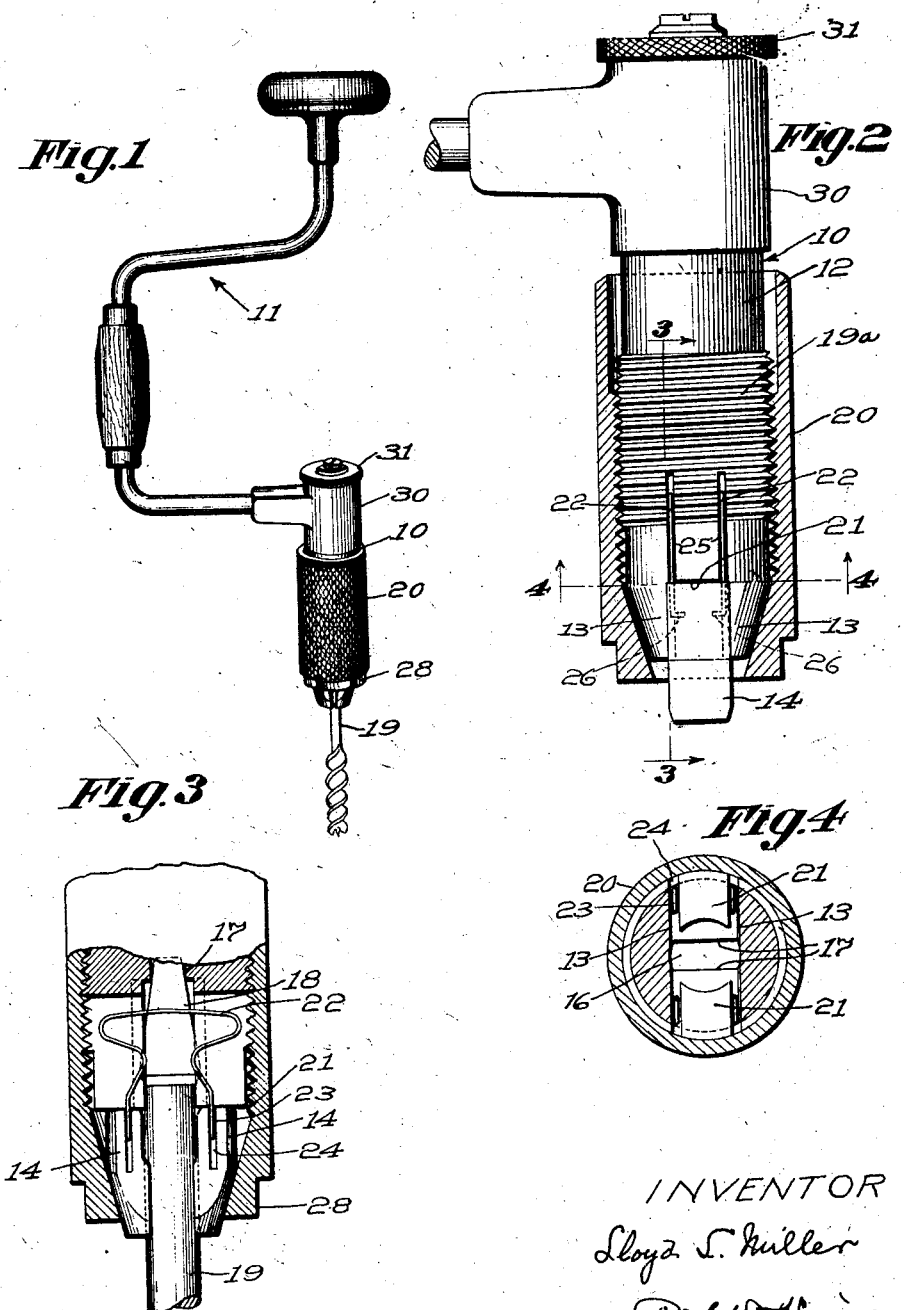
INVENTOR
Lloyd L. Miller
BY Robt D. Harris
ATTORNEY

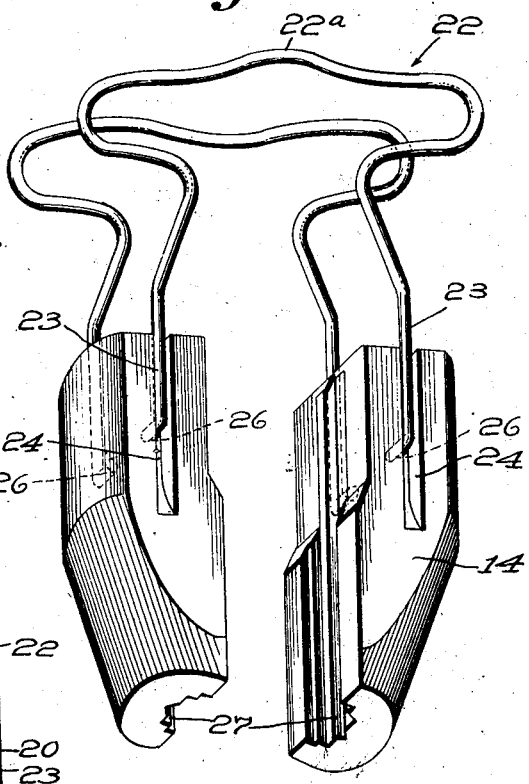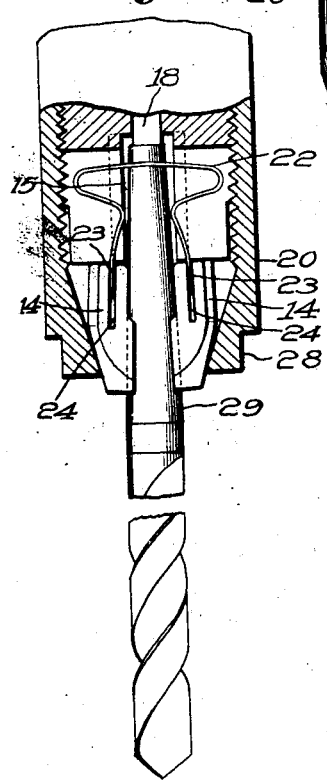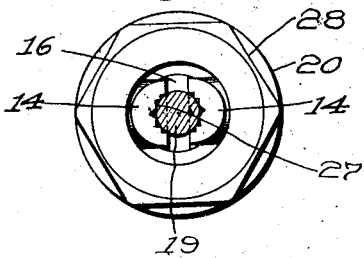

Patented July 27, 1926.

1,593,908

UNITED STATES PATENT OFFICE.

LLOYD L. MILLER, OF CONWAY, MASSACHUSETTS, ASSIGNOR TO GOODELL-PRATT COMPANY, OF GREENFIELD, MASSACHUSETTS, A CORPORATION OF MASSACHUSETTS.

BIT-BRACE CHUCK.

Application filed March 12, 1925. Serial No. 15,006.

This invention relates to an improved chuck for bit braces.

Brace bits are usually provided with a squared or four-sided, wedged-shaped end portion adapted to be engaged by the jaws of a brace, but it often happens that this squared end portion is slightly out of alignment with the longitudinal axis of the bit, with the result that the bit wobbles more or less when rotated by the brace.

One feature of the present invention therefore resides in a bit chuck which is so constructed that the bit may be readily inserted in the chuck far enough to cause its squared end to clear the jaws and lie between a pair of spaced walls formed at the base of the bit receiving socket, whereupon the jaws are moved into gripping engagement with the round portion of the shank to hold the bit and brace in accurate alignment.

Altho many bits are provided with the squared end portion above mentioned, it is sometimes desirable to use in a brace a bit or drill which is not provided with this squared end. Some of these bits or drills have a rounded shank thruout their length while others have a relatively long tapered shank. It is therefore desirable to provide a bit chuck that is constructed to firmly hold any one of these three different types of shanks.

Another feature of the invention therefore resides in a bit brace chuck which is constructed to hold bits having either a squared or round shank, and also bits or drills having a tapered shank.

In order that the chuck may properly hold these different types of shanks it is necessary that the jaws be so mounted that they are free to lie parallel to each other when engaging a round shank and may lie at an inclination to each other when engaging a tapered shank.

Another feature of the invention therefore resides in means for supporting the jaws so that they are permitted considerable freedom of movement within the chuck and are yieldingly held in spaced and approximately parallel relation.

Still another feature of the invention resides in the construction of the work engaging faces of the jaws which enables them to hold the work with a firm biting grip.

Other features of the invention and novel combination of parts in addition to the above will be hereinafter described in connection with the accompanying drawings which illustrate one good practical form of the invention.

In the drawings:—

Fig. 1 is a side view of a brace provided with a bit chuck constructed in accordance with the present invention.

Fig. 2 is an enlarged side view of the chuck with the shell shown in section.

Fig. 3 is a sectional view taken on the line 3—3 of Fig. 2.

Fig. 4 is a sectional view taken on the line 4—4 of Fig. 2.

Fig. 5 is an enlarged perspective view of the jaws and cooperating springs.

Fig 6 is an end view of the chuck; and

Fig. 7 is a view similar to Fig. 3, but shows the jaws gripping the tapered shank of a bit or drill.

The chuck 10 of the present invention may be used in connection with any preferred or desired type of brace 11 that may be provided with a post 12 having a bit receiving socket formed therein.

The lower end of the post 12 is cut away to form the spaced walls 13 adapted to support the jaws 14 and the post is provided with a shank receiving socket 15, at the inner end of which is formed the transversely extending slot 16. The opposite walls 17 of this slot are positioned to receive the squared or flattened end 18 of a bit 19 between them, and the construction is such that when the squared end 18 of a bit is inserted in the slot 16 it is impossible for the bit to turn in the chuck.

The post 12 is externally threaded as at 19ª to receive the internally threaded shell 20, and the bore of the shell is tapered at its lower end to conform to the taper of the jaws 14. The arrangement is such that as the shell 20 is screwed upwardly upon the post 12 it forces the jaws towards each other into firm gripping engagement with the bit or other tool to be operated, and since the inner ends of the jaws 14 abut against faces 21 of the post they are prevented from moving upwardly with the shell.

It is important that means be provided for urging the jaws 14 apart as the shell 20 is moved in a direction to release the jaws, and it is desirable that the means for moving the jaws apart be so constructed that it will normally hold the jaws in spaced substantially parallel relation and will permit them to assume an angle to each other as they are forced into engagement with a tapered shank.

This is accomplished in accordance with the present invention by providing a pair of approximately U-shaped springs 22 having the outwardly extending legs 23 that are adapted to lie in grooves 24 formed in the opposite faces of the jaws 14. The portion of each U-shaped spring that connects the legs 23 is made relatively wide and has a central portion 22$^a$ that is bent or off-set slightly. This is desirable because each spring is mounted in a slot 25 extending longitudinally of the post 12 and this construction causes the springs to bind frictionally in the slots so that while they may be readily removed or inserted, they are frictionally held in place. The legs 23 normally lie a substantial distance apart and extend approximately parallel to each other, and as a result they normally hold the jaws in spaced parallel relation, as shown in Fig. 5.

The jaw supporting walls 13 of the post lie over the legs 23 when the parts are assembled, and this prevents the legs from springing out of the grooves 24. In order to prevent the jaws from moving lengthwise of the legs 23 the ends of these legs are bent as at 26 and extend into holes formed in the jaws. As a result of this construction the springs hold the jaws in place between the walls 13 so that the jaws will not become displaced even when the shell 20 is removed.

To insure that the jaws will firmly hold the tool to be operated, each jaw has a plurality of serrations or ribs 27 extending longitudinally of its tool engaging face to bite into the tool. The lower end of the shell 20 is shown as slabbed off to form a hexagon nut 28. This is provided so that a wrench may be applied to the shell when it is desired to apply an abnormal rotating force to the shell 20.

It should be noted that the jaws 14 are so supported that they will engage either a straight shank, as shown in Fig. 3, or a tapering shank 29, as shown in Fig. 7, and that this engagement extends thruout the length of the jaws.

The post 12 may be mounted to rotate in the hub portion 30 of the brace, and the disk 31 may control ratchet mechanism within the hub 30, but this is not a part of the present invention.

What is claimed is:—

1. A bit brace chuck, comprising in combination, a post having a deep central socket adapted to receive the squared end of a bit and also a portion of its rounded shank and further provided with a pair of spring receiving slots extending across the post at opposite sides of the socket, a pair of jaws mounted within the post for movement bodily toward and from each other and spaced a sufficient distance from the inner end of the socket to clear said squared end and grip the round shank of the bit, a pair of springs each having an intermediate portion lying in one of said slots and spaced legs engaging the jaws to force them apart, and adjustable means for forcing the jaws toward each other into gripping engagement with the bit.

2. A bit brace chuck, comprising in combination, a post having a bit receiving socket formed with spaced jaw-engaging walls and having a pair of spring receiving slots extending longitudinally of the post at opposite sides of its axis, a pair of approximately U-shaped springs constructed to lie in said slots and to be held frictionally therein, a pair of jaws supported by said post and having grooves formed in their opposite faces to receive the spaced legs of the U-shaped springs so that the spring legs are retained in the grooves by said walls and the jaws are held yieldingly in spaced relation by the springs, and a shell adjustable lengthwise of the post to force the jaws toward each other.

3. A bit brace chuck, comprising in combination, a post having a bit receiving socket formed with spaced jaw-engaging walls and having a pair of spring receiving slots extending longitudinally of the post at opposite sides of its axis, a pair of approximately U-shaped springs constructed to lie in said slots and to be held frictionally therein, a pair of jaws supported by said post and having grooves formed in their opposite faces to receive the spaced legs of the U-shaped springs so that the jaws are held yieldingly in spaced relation by the springs, each spring leg being held in the jaw groove by one of said walls and having means for preventing sliding movement of the leg lengthwise of the groove that receives it, and a shell for forcing the jaws toward each other.

4. A bit brace chuck, comprising in combination, a post having a pair of spaced walls positioned to support a pair of jaws between the walls and having a pair of spring receiving slots extending longitudinally of the post at opposite sides of its axis, a pair of approximately U-shaped springs constructed to lie in said slots and having a bent portion for frictionally retaining them in the slots, a pair of jaws mounted between said spaced walls and having grooves formed in their opposite faces to receive the spaced legs of the U-shaped springs so that the jaws are held yieldingly in spaced relation by the springs and the legs of the springs are held in the grooves by the jaw supporting walls, said spring legs being provided with means for preventing sliding movement of the legs lengthwise of the grooves in which they lie, and means for forcing the jaws into gripping engagement with a bit.

5. A bit brace chuck, comprising in combination, a post having a deep central socket adapted to receive the squared end of a bit and also a portion of its rounded shank and provided with a driving recess at the inner end of the socket for receiving and positively driving the squared end of the bit and further provided with a pair of spring receiving slots extending across the post at opposite sides of the socket, a pair of jaws mounted within the post for movement bodily toward and from each other and spaced a sufficient distance from the inner end of the socket to clear said squared end and grip the round shank of the bit, a pair of springs each having an intermediate portion lying in one of said slots and spaced legs engaging the jaws to force them apart, and a shell for forcing the jaws toward each other into engagement with the bit shank.

6. A bit brace chuck, comprising in combination, a post having a bit receiving socket formed with spaced jaw engaging walls and having a pair of spring receiving slots extending across the post at opposite sides of its axis, a pair of springs constructed to lie in the slots and to be held frictionally therein, and having spaced legs that are held against the side faces of the jaws by said walls, a pair of jaws supported by said post and engaged and normally held by said springs in spaced relation to each other, and means for forcing the jaws towards each other into gripping engagement with a bit.

7. A bit brace chuck, comprising in combination, a post having a deep socket adapted to receive the squared end of a bit and also a portion of its rounded shank and provided with a driving slot at the inner end of the socket for receiving and positively driving the squared end of the bit and further provided with a pair of spring receiving slots extending across the post at opposite sides of the socket, a pair of jaws mounted within the post and spaced sufficiently from the inner end of the socket to clear said squared end and grip the round shank of the bit, a pair of approximately U-shaped springs each having a transversely extending portion frictionally retained in one of the spring slots and legs extending therefrom that engage and position the jaws, and a shell for forcing the jaws toward each other into engagement with the bit shank.

8. A bit brace chuck, comprising in combination, a post having a central socket to receive a relatively long bit shank and formed with spaced jaw engaging walls and also formed with a pair of spring receiving slots disposed at the opposite sides of its axis, a pair of jaws mounted between the jaw engaging walls of the post for movement bodily toward and from each other, a pair of springs each having an intermediate portion frictionally held in one of said slots and spaced legs engaging the jaws to force them apart, and a shell for forcing the jaws toward each other into engagement with the bit shank.

9. A bit brace chuck, comprising in combination, a post having a central socket and formed with spaced jaw engaging walls, a pair of jaws mounted between the jaw engaging walls of the post for movement bodily toward and from each other and each jaw having spring receiving slots formed in its opposite faces, a pair of springs for forcing the jaws apart and each having spaced legs that lie in said lots and are retained therein by the jaw engaging walls, and a shell for forcing the jaws toward each other into gripping engagement with the bit.

In testimony whereof, I have signed my name to this specification.

LLOYD L. MILLER